2,758,014

CATALYTIC PROCESS FOR PREPARING CUPROUS OXIDE FROM MIXED COPPER OXIDES

Joseph E. Drapeau, Jr., Calumet City, Ill., and Paul D. Johnson, Gary, Ind., assignors to The Glidden Company, Cleveland, Ohio, a corporation of Ohio No Drawing. Application April 23, 1953,
Serial No. 350,777

10 Claims. (Cl. 23—147)

This invention relates to a novel catalytic process for converting mixed copper oxides into red cuprous oxide.

Mixtures containing metallic copper with cuprous and cupric oxides are available commercially as the end product of a variety of processes. For instance, the well known copper ammonium carbonate leaching process for the extraction of copper gives as its final product a mixture of copper oxides. Furthermore, the roasting of metallic copper such as scrap copper usually produces a mixture of copper oxides, particularly when metallic copper remains in the mass at the conclusion of the roasting. In such a process, the roasted mass is tumbled or otherwise abraded to remove the oxides from the metallic copper, after which the oxides are separated from the coarse particles or pieces of metallic copper, and the latter are recycled for additional roasting. See U. S. Patent No. 2,304,078 to Drapeau et al.

Mixtures of oxides such as result from the above and other processes can be used in the present process for the preparation of cuprous oxide. Moreover, cupric oxide alone can also be used either by first subjecting it to a mild reduction so as to prepare a mixture of metallic copper with cuprous and cupric oxides, or by mixing it directly with metallic copper, or both.

Suitable mixtures such as described above are hereinafter referred to as "oxidic copper mixtures."

As noted above, the present invention is concerned with the conversion of such oxidic copper mixtures into cuprous oxide of good red color, and is based on our discovery that such conversion can be accomplished on a commercial basis by the use of ammonium and/or potassium persulfate as a catalyst therefor when the total reducing power of the mixture is between about 95% and 105% that of pure cuprous oxide.

Accordingly, it is an object of this invention to provide a novel catalytic process for preparing red cuprous oxide from oxidic copper mixtures having a total reducing power around 95 to 105%.

It is a further object to provide a novel catalytic process for converting oxidic copper mixtures into cuprous oxide having a purity of 95% or higher.

Another object is to provide a novel process for increasing the cuprous oxide content of an oxidic copper mixture.

These and other objects will be apparent from the following description of the invention.

We have found that when an oxidic copper mixture has a total reducing power between about 95% and 105% that of $Cu_2O$, it can be treated in the form of an aqueous paste with a small, catalytic amount of ammonium persulfate and/or alkali-metal persulfates under substantially non-oxidizing conditions at temperatures between about 40° F. and 150° F. for a suitable period of time to cause it to be converted to cuprous oxide of at least sufficient purity to meet current commercial specifications. Such specifications usually correspond to U. S. Navy Specification MIL-C-15169, and call for a minimum of 95% cuprous oxide on Grade II material, a minimum of 97% cuprous oxide on Grade I material and a minimum total reducing power of 97% on both grades.

The amounts of persulfate used in such treatment can be from about 0.5% to 5.0% or more by weight on the oxidic copper mixture but since the effect is catalytic in nature there is little need to use more than will effect the desired conversion within the desired period of time. We prefer to use amounts of persulfate corresponding to between about ½% and 2% by weight on the oxidic copper mixture being treated, and we prefer ammonium persulfate over alkali-metal persulfates because of its availability and activity.

The foregoing amounts of catalyst can be dissolved in any desired amount of water to give a solution ranging from very dilute up to saturation. However, since all of the treated mass must usually be dried prior to shipping, we prefer to use as little water as is consistent with good wetting of the charge and with an economical over-all treatment cost, such as an amount between about 10% and 30% by weight of the mixture being treated. Such amounts give the mass which is to be treated a pasty consistency.

We have found that mixtures containing up to 44% free copper can be treated commercially by our process without requiring an unusually prolonged treating time. If treating time is not a factor to be considered, then any mixtures of CuO and metallic copper which have a total reducing power between about 95% and 105% can be converted by our process to specification-grade cuprous oxide. It is more practical, of course, to reduce the CuO to a mixture of $Cu_2O$ and CuO, with or without metallic copper, since less added metallic copper is then needed to bring the total reducing power into the range stated above.

Without wishing to be bound by the theory here expressed, we believe that the reactions which are promoted by the aqueous persulfate treatment are represented by the following equations:

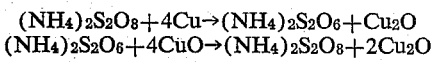

The cyclic nature of the reactions is evident from these equations. It is also evident when the mechanism of the reactions is disregarded, the ultimate reaction promoted by the aqueous catalyst is:

Accordingly, it will be clear that the starting mixture should have its CuO content and its metallic copper content substantially in balance on a stoichiometric basis; this of course is the same thing as calling for a total reducing power around 100% in the starting mixture. When the total reducing power is not exactly 100%, but is between about 95% to 105%, then either CuO or Cu remains in slight excess at the conclusion of the treatment. Moreover, since some slight amount of oxidation of $Cu_2O$ by air may occur even in a closed container during the course of the treatment, additional small quantities of CuO are formed and either add to the excess CuO when the initial total reducing power was below 100%, or consume some of the metallic copper which would otherwise remain when the initial total reducing power was over 100%. Those skilled in the art will understand that such adventitious results can be suitably offset by minimizing oxidation by the air and by initially adjusting the total reducing power of the charge.

The following examples illustrate the above-described catalytic treatment:

Example 1

908 grams of a dry mixture composed of 43.73% fine copper powder and remainder cupric oxide, and having a total reducing power close to 100%, was mixed with 110 ml. water and 27 grams of ammonium persulfate in a closed glass flask fitted with a Bunsen valve to keep air out. The resulting mixture was allowed to stand with occasional shaking for 72 hours at room temperature. The solid matter in the flask was then filtered from most of the liquid, and then was dried by heating on a hot plate under substantially non-oxidizing conditions. The dry material was analyzed chemically and was found to contain 97.50% cuprous oxide. Its total reducing power was about 98.5%. After being passed through a hammer mill, it all was fine enough to pass through a 325 mesh screen.

It will be noted that the ammonium persulfate in this example amounted to about 3% by weight on the original mixture.

The filtrate from the above example was used again in treating a similar mixture of fine copper and cupric oxide, and was found to be substantially as effective as in Example 1, thereby indicating that the activity of the catalyst is not materially impaired by the reactions which it promotes.

*Example 2*

A fine oxidic copper mixture having a total reducing power of 103%, was mixed with added cupric oxide to provide a mixture composed of 10.79% free copper, 75.72% cuprous oxide, remainder cupric oxide, and having a total reducing power of 100%. 200 grams of the resulting dry mass was mixed with 2 grams ammonium persulfate and 35 ml. water, and was allowed to stand in a closed glass flask (fitted with a Bunsen valve) with occasional shaking at room temperature (about 70° F.) for 18 hours. It was then dried under substantially non-oxidizing conditions and analyzed:

|  | Per cent |
|---|---|
| Free copper | [1] 0.50 |
| Cuprous oxide | [1] 97.50 |
| Cupric oxide | [1] 1.40 |
| Copper-free material | 1.60 |

[1] Total reducing power 98.60%.

The dried material had a clean maroon color, was free of brown tints, and could be ground satisfactorily to prepare pigmentary material of good color when care was exercised to avoid the production of excessive fine material during grinding.

*Example 3*

A coarse, dry mixture having a total reducing power of 120% was mixed with cupric oxide to produce an adjusted mixture having a total reducing power of 100% and composed of 21.40% free copper, 51.80% cuprous oxide, balance cupric oxide. The adjusted mixture in an amount of 200 grams, was mixed with 4 grams of ammonium persulfate and 35 ml. of water and was allowed to stand in a glass flask on a hot plate at about 150° F. for 96 hours. The flask was fitted with a Bunsen valve to keep air out and was otherwise closed. The contents of the flask was then dried, and was subsequently analyzed:

|  | Per cent |
|---|---|
| Free copper | [1] 2.44 |
| Cuprous oxide | [1] 95.99 |
| Cupric oxide | [1] 1.06 |
| Copper-free material | [1] 1.5 |

[1] Total reducing power 100.5%.

The resulting material had a clean maroon color and could be ground to prepare pigmentary material of good color.

*Example 4*

The oxidic copper mixture of Example 3 was roasted under mildly oxidizing conditions until the total reducing power had been lowered somewhat by oxidizing some free copper. The roasted mixture was then treated as in Example 3, with similar results.

*Example 5*

A dry oxidic copper mixture having a total reducing power of 92% was mixed with fine copper powder to raise its reducing power to 100%. The resulting adjusted mixture was composed of 5.40% free copper, 87.84% cuprous oxide, and remainder cupric oxide. 200 grams of the adjusted mixture was treated as in Example 2 to produce a dry product having a total reducing power of 99.20% and composed of:

|  | Per cent |
|---|---|
| Free copper | 0.44 |
| Cuprous oxide | 98.20 |
| Cupric oxide | 0.36 |
| Copper-free material | 1.00 |

The product so prepared was satisfactory for use in preparing pigmentary cuprous oxide of specification grade.

While the starting materials in Examples 1–3 and 5 were adjusted in total reducing power by adding either cupric oxide or metallic copper powder, it will be evident that the reducing power of a starting mixture can be adjusted equally well by subjecting it to a mild oxidizing treatment as in Example 4, followed or not by a finishing minor adjustment with cupric oxide or copper powder. The following example also illustrates an adjustment of reducing power by subjecting the starting material to a reducing treatment.

*Example 6*

An oxidic copper mixture having a total reducing power below 70% and containing practically no free copper was reduced by heating in a furnace having a gaseous reducing atmosphere until the total reducing power had reached approximately 100%. The reduced mass, upon chemical analysis, was found to consist of:

|  | Per cent |
|---|---|
| Free copper | 9.06 |
| Cuprous oxide | 79.60 |
| Cupric oxide | 11.34 |
|  | 100.00 |

Two thousand grams of the reduced mass was introduced into a vented ceramic-lined steel drum capable of being slowly rotated about a horizontal axis, and capable of being heated externally when desired. 350 ml. of water and 40 grams of ammonium persulfate were added. The drum was closed, and was slowly rotated for 24 hours, no heat being applied during this period. At the end of the 24 hour period, enough heat was applied to the drum to cause water and ammonia to be evaporated and exhausted at a convenient rate through the vent. The drum was rotated under these conditions until the contents had been dried. The resulting dry material had a total reducing power of 100%, and had the following chemical analysis:

|  | Per cent |
|---|---|
| Free copper | 1.32 |
| Cuprous oxide | 97.03 |
| Cupric oxide | Trace |

The resulting material had a clean red color, and could be ground satisfactorily to prepare pigmentary material.

*Example 7*

Cupric oxide and very fine copper powder were mixed together in proportions needed to give the mixture a total reducing power of 100%. 200 grams of the mixture was slurried with 35 ml. water and 6 grams of ammonium persulfate. Another 200 gram portion of the mixture was similarly slurried with 35 ml. of water and 6 grams of potassium persulfate. Both samples were contained in closed glass flasks fitted with Bunsen valves and were treated in the manner described in Example 3.

At the end of four days, the following results were found on analysis:

|  | T. R. P. | Cu₂O | Free Cu |
|---|---|---|---|
| (NH₄)₂S₂O₈ | 100.00 | 99.32 | 0.30 |
| K₂S₂O₈ | 100.00 | 94.65 | 2.38 |

It is evident from these results that ammonium persulfate acts a little faster than does potassium persulfate, but that the alkali-metal persulfate functions analogously and effectively to convert oxidic copper mixtures containing free copper to cuprous oxide.

From the foregoing description and examples of the invention, it will be understood that the invention provides a novel and facile method for preparing cuprous oxide which meets current specifications thereon. It will also be apparent that the invention stems from our discovery of the catalytic effects of ammonium and alkali-metal persulfates in bringing about such conversions. The principles herein set forth can be practiced in various manners, as exemplified, and are expressed in the following claims defining the scope of our invention.

Having now described our invention, what we claim is:

1. The process of preparing commercially pure, red, cuprous oxide from oxidic copper compounds selected from the group consisting of cupric oxide, and mixtures of cupric and cuprous oxides having a total reducing power below about 95% that of cuprous oxide, which comprises: adjusting the total reducing power of the starting material to a level between about 95% and 105% that of cuprous oxide; then treating the adjusted material with an aqueous solution of catalyst selected from the group consisting of ammonium persulfate, alkali-metal persulfate, and mixtures thereof, said solution providing between about 0.5% and 5% of catalyst and between about 10% and about 30% of water by weight on the starting material, said treatment being carried out under substantially non-oxidizing conditions at temperatures between about 40° F. and 150° F. until the cuprous oxide content of the treated material, on a dry basis, is at least about 95%; and thereafter drying the treated material under substantially non-oxidizing conditions.

2. The process as claimed in claim 1 wherein the catalyst is ammonium persulfate.

3. The process as claimed in claim 2 wherein the treatment is continued until the cuprous oxide content is at least about 97% by weight on the treated material.

4. A process for treating an oxidic copper mixture containing cupric oxide to increase its cuprous oxide content, which comprises: treating said oxidic copper mixture under substantially non-oxidizing conditions and in the presence of metallic copper with an aqueous solution of persulfate catalyst selected from the group consisting of ammonium persulfate, alkali-metal persulfate and mixtures thereof, until substantially all of the available metallic copper which is needed to reduce said cupric oxide to cuprous oxide has been consumed, said aqueous solution providing between about 0.5% and 5% of catalyst by weight on the total solids of the treated mass, and said treatment being conducted at temperatures between about 40° F. and 150° F.; and thereafter drying the treated mass under substantially non-oxidizing conditions.

5. The process as claimed in claim 4 wherein the metallic copper is present in an amount substantially equivalent stoichiometrically to the amount of cupric oxide in the oxidic copper mixture, on the basis of the equation:

$$Cu + CuO \rightarrow Cu_2O$$

whereby the mass of solids obtained at the conclusion of the treatment is substantially all cuprous oxide.

6. The process as claimed in claim 5 wherein the amount of persulfate catalyst is between about 1% and 3%.

7. The process as claimed in claim 4 wherein the amount of persulfate catalyst is between about 1% and 3%.

8. The process as claimed in claim 7 wherein the catalyst is ammonium persulfate.

9. A process for treating cupric oxide to convert at least a part thereof to cuprous oxide, which comprises: treating said cupric oxide under substantially non-oxidizing conditions and in the presence of metallic copper with an aqueous solution of persulfate catalyst selected from the group consisting of ammonium persulfate, alkali-metal persulfate and mixtures thereof, until substantially all of the available metallic copper which is needed to reduce said cupric oxide to cuprous oxide has been consumed, said aqueous solution providing between about 0.5% and 5% of catalyst by weight on the total solids of the treated mass, and said treatment being conducted at temperatures between about 40° F. and 150° F.; and thereafter drying the treated mass under substantially non-oxidizing conditions.

10. The process as claimed in claim 9 wherein the metallic copper is present in an amount substantially equivalent stoichiometrically to the amount of cupric oxide in the oxidic copper mixture, on the basis of the equation:

$$Cu + CuO \rightarrow Cu_2O$$

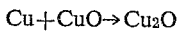

whereby the mass of solids obtained at the conclusion of the treatment is substantially all cuprous oxide.

References Cited in the file of this patent

UNITED STATES PATENTS

| 611,917 | Koehler | Oct. 4, 1898 |
| 1,131,986 | Benedict | Mar. 16, 1915 |
| 1,763,781 | Heath et al. | June 17, 1930 |
| 1,963,105 | Swift | June 19, 1934 |

OTHER REFERENCES

J. W. Mellor's "A Comprehensive Treatise on Inorganic and Theoretical Chemistry," vol. 3, 1923 ed., page 138; Longmans, Green and Co., New York.